(12) United States Patent
Subramanya (10) Patent No.: US 9,292,529 B2
(45) Date of Patent: Mar. 22, 2016

(54) FILE CHANGE DETECTOR AND TRACKER

(75) Inventor: Ramya Subramanya, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 12/635,207

(22) Filed: Dec. 10, 2009

(65) Prior Publication Data

US 2011/0145216 A1 Jun. 16, 2011

(51) Int. Cl.
*G06F 17/30* (2006.01)

(52) U.S. Cl.
CPC .... *G06F 17/30144* (2013.01); *G06F 17/30864* (2013.01)

(58) Field of Classification Search
USPC .................................................. 707/755, 741
See application file for complete search history.

(56) References Cited

U.S. PATENT DOCUMENTS 6,560,614 B1 * 5/2003 Barboy et al. ................ 707/611

OTHER PUBLICATIONS

"ChangeDetector(TM): A Site-Level Monitoring Tool for the WWW" by Vijay Boyapati, www2002, May 7-11, 2002, Honolulu, Hawaii, USA. ACM 1-58113-449-5/02/0005.*
Oracle Secure Enterprise Search Administrator's Guide, 2006.*
Microsoft "Creating, Modifying and Deleting a Change Journal" obtained from http://msdn.microsoft.com/en-us/library/aa363877(VS.85).aspx; Dec. 3, 2009 Microsoft Corporation.

* cited by examiner

*Primary Examiner* — Rehana Perveen
*Assistant Examiner* — Tiffany Thuy Bui
(74) *Attorney, Agent, or Firm* — Trellis IP Law Group, PC (57) ABSTRACT

A method for detecting changes in a computing environment. In an example embodiment, the method includes observing a file system of the computing environment during a predetermined time interval and providing a signal when a predetermined change to the file system is detected during the predetermined time interval; employing the signal to log a description of detected file system changes; and using a logged description of the file system changes to perform an incremental crawl of the file system. In a more specific embodiment, the predetermined time interval includes an interval of time between crawls of the file system. The predetermined change to the file system includes a change to content of a file included in the file system, a change in user access rights to a file, a change in a location of a file of the file system, a change in a folder of the file system, a deletion of a file or folder in the file system, and so on.

9 Claims, 5 Drawing Sheets

FILE CHANGE DETECTOR AND TRACKER

BACKGROUND

This application relates in general to computer data storage and more specifically to systems and methods for ascertaining or documenting changes made to a file system.

For the purposes of the present discussion, a file system may be any organization of files and accompanying data. An example file system represents a special-purpose database for the storage, organization, manipulation, and retrieval of data. A file system may also refer to the software and/or methods used to organize and/or maintain the files in accordance with predetermine rules. Changes to a file system may include changes to data within a file, changes to metadata associated with the file, changes in file locations (e.g., path changes) within the file system, changes to folder content and location, changes in user access rights or other security information associated with a given file, folder, or associated directory structure, and so on.

Systems for documenting file system changes are employed in various demanding applications, including Secure Enterprise Search (SES), disc-space utilization software, Web-searching applications, software for repairing broken hyperlinks in large websites with multiple pages and hyperlinks, and so on. Such applications demand versatile systems and methods for quickly and accurately ascertaining changes made to a file system.

Systems and methods for quickly and accurately ascertaining changes made to a file system are particularly important in data-search applications, such as Secure Enterprise Search (SES), where accompanying search indexes must be periodically updated with file system changes to enable accurate search results.

In an example SES application, file system documents, such as Hypertext Markup Language (HTML) web pages, are indexed to facilitate searches. The SES application may employ the index to facilitate rapid searches of file system documents for desired content.

To enable accurate searches, the search index is periodically updated to reflect file system changes. For example, the search index is updated when documents and the content therein are changed, deleted, added, renamed, and/or moved; when document access rights change, and so on.

Conventionally, a process called crawling is used to analyze files in a file system and then update the search index accordingly. To reduce the time required to update the search index, crawling software may first implement a file system scan to determine what files and folders have changed since the last crawling operation. Subsequent crawling, called incremental crawling, is then limited to only components of the file system that have changed.

Crawling software may be implemented, for example, via a Windows New Technology File System (NTFS) connector. The NTFS connector may be implemented via Oracle SES. The connector collects content and Access Control List (ACL) data associated with all files and folders in an accompanying NTFS file system. Each file and folder in the NTFS file system is associated with a LastModifiedDate attribute, which is updated when a file changes but not when user access rights thereto change. To ascertain file and folder changes, including changes to user access rights for particular files or folders, the connector fetches the LastModifiedDate attributes and the Access Control List (ACL) for each file and folder in the file system. Unfortunately, fetching the LastModifiedDate attributes and the ACL in large enterprise applications is often undesirably time consuming, resulting in lengthy incremental crawling operations.

In general, conventional methods for ascertaining file system changes since the last crawling operation are undesirably slow. In an enterprise file system with terabytes of data, a given crawling operation may take weeks, depending on available computing resources. This may be particularly problematic in situations where substantial file system changes have occurred before crawling is complete.

SUMMARY

An example method for monitoring changes in a computing environment includes detecting changes to a file system of the computing environment when changes to the file system occur and providing indications of detected changes in response thereto; and collecting the indications of detected changes as the changes are detected.

In a more specific embodiment, the file system is part of an enterprise computing environment. The detected changes include changes to user access rights to a given file or folder in the file system and further include any changes to one or more Access Control Lists (ACLs). Collecting the detected changes may include logging indications of detected changes in a first file, also called a log.

The method further includes flushing contents of a second file and copying contents of the first file to the second file at a predetermined time. The predetermined time approximately coincides with the completion of a crawl of the file system. An incremental crawl of the file system is then performed using the second file. The second file and/or the first file may be stored via one or more Oracle Extensible Tables (OETs).

To facilitate implementing the incremental crawl, a Web service selectively retrieves information from the second file to search software, such as Secure Enterprise Search (SES) software.

To facilitate detecting file system changes, a File Change Detector (FCD) facilitates determining file system paths (UNC paths) to monitor, and then uses File System Watcher (FSW) functionality to monitor files or folders associated with the file system paths. The file system includes a Windows NT File System (NTFS). The file system paths include one or more Universal Naming Convention (UNC) paths. In the present example embodiment, the FCD uses a configuration file to retrieve one or more UNC paths for monitoring.

The Web service to determines if the FCD started before completion of a most recent crawl of the file system or after. A conventional crawl may be performed initially if the FCD was activated after completion of the most recent crawl. An FCD-based incremental crawl is performed using the detected changes if the FCD was activated before completion of the most recent crawl.

The novel design of certain embodiments disclosed herein is facilitated by the collection of documentation pertaining to file system changes as the changes are detected during predetermined time intervals. This enables search software and accompanying crawling software to limit crawling to only file system components that have changed over a predetermined interval. By collecting file system changes or descriptions thereof in a record, such as a log, as the changes are made, search software no longer needs to scan the file system for attributes and information, such as LastModifiedDate attributes and user-access rights information, to indicate which files or folders have changed since a last incremental crawl. Maintenance of a change log may greatly expedites file system crawling.

Conventional systems for tracking and crawling a file system generally do not track changes in file/folder permissions (corresponding to changes in an ACL) in combination with changes to the file/folder itself. Furthermore, existing systems for tracking file changes typically do not collect or aggregate changes made throughout a file system, but instead track certain changes, e.g., by adjusting file attributes, such as a LastModifiedDate attribute. Furthermore, conventional crawling software typically does not collect changes to the file system as the changes occur, but instead determines the changes by scanning the entire system for specific file/folder attributes, such as LastModifiedDate attributes. Such scanning is undesirably time consuming. Certain embodiments discussed herein address these problems, enabling rapid incremental crawls of file systems.

Performance tests suggest that incremental crawling based on an embodiment disclosed herein may be more than twice as fast, given the same computing resources, as conventional incremental crawling based on an initial scan of the file system to detect file system changes before implementing the incremental crawl.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For clarity, certain well-known components, such as hard drives, processors, operating systems, servers, databases, power supplies, and so on, have been omitted from certain figures. However, those skilled in the art with access to the present teachings will know which components to implement and how to implement them to meet the needs of a given application.

Figure 1:
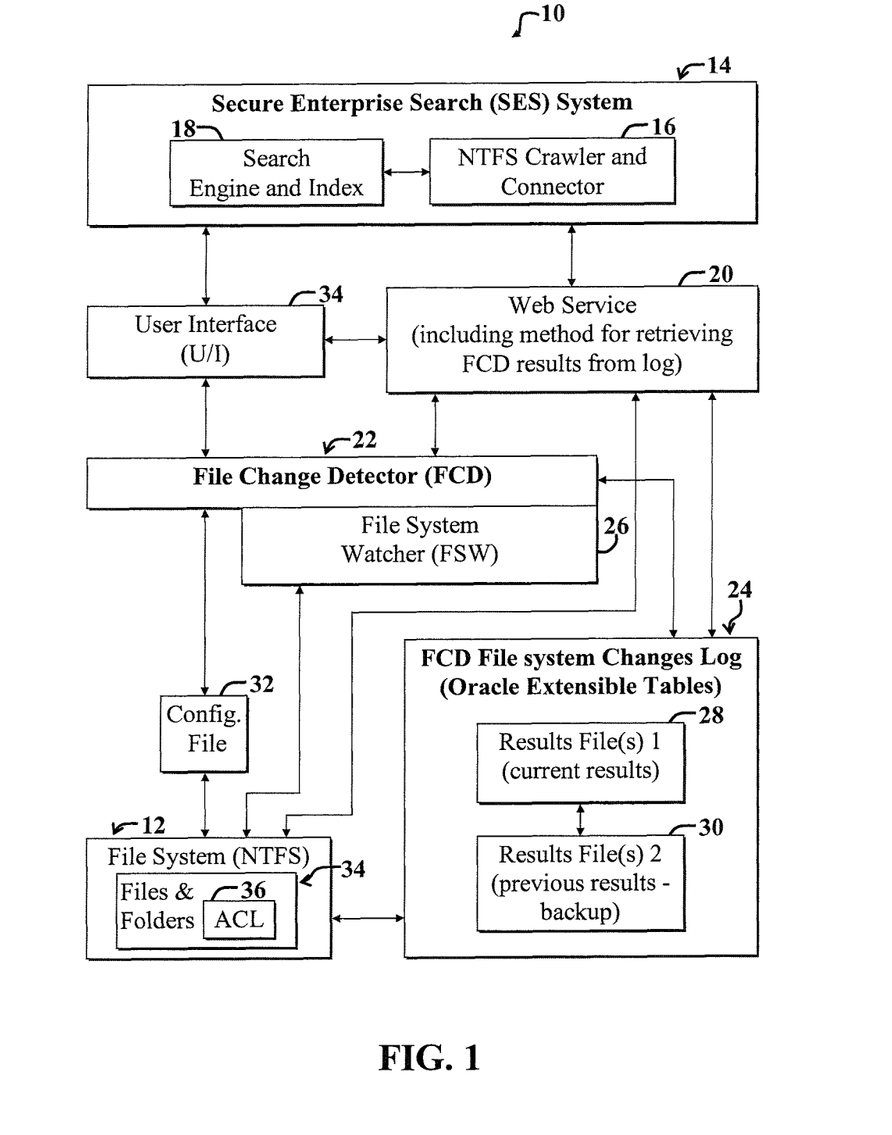
FIG. 1 is a diagram illustrating a first example embodiment of a system for detecting file system changes and using the changes to implement a crawl of the file system.

FIG. 1 is a diagram illustrating a first example embodiment of a system 10 for detecting file system changes and using indications the changes to implement a crawl of the file system 12.

The present example system 10 includes an Oracle Secure Enterprise Search (SES) system 14, which includes a Windows NT File System (NTFS) crawler and connector 16 in communication with a search engine and index 18. A Web service 20 interfaces the SES system 14 with a File Change Detector (FCD) 22, changes log 24, and the file system 12. For illustrative purposes, the changes log 24 is shown including a first results file 28 for storing currently detected file system changes, and a second results file 30 for storing previously detected file system changes. Plural instances of the first file 28 and the second file 30 may be employed in certain implementations, as discussed more fully below.

The FCD 22 employs a File System Watcher (FSW) module 26 to monitor the file system 12 for changes, i.e., the FCD 22 employs FSW functionality to detect file system changes. For the purposes of the present discussion, FSW functionality may be any features, functions, or capabilities associated with particular software that is adapted to detect changes in a file system. An example of the particular software includes a FileSystemWatcher object class provided in the .NET Framework Class Library. The FileSystemWatcher object class by .NET may be used to implement the FSW module 26.

In the present example embodiment, the FCD 22 is implemented via a Windows service, which may run on a server. For the purposes of the present discussion, a Windows service may be any executable software application adapted to perform one or more specific functions without requiring user intervention. An example Windows service can be configured to start when an associated operating system, such as a version of Windows®, is booted and run in the background while Windows is running, or the Windows service can be started manually when required. A server may be any computer or software adapted to provide content to one or more different software applications, computers, or devices, called clients.

The FCD 22 employs a configuration file 32 to facilitate obtaining Universal Naming Convention (UNC) paths to monitor for the file system 12. For illustrative purposes, a user interface (U/I) 34 is shown coupled to the Web service 20, the SES system 14, and the FCD 22. The user interface 34 may include hardware, software, Graphical User Interfaces (GUIs), and so on, for enabling certain user control over the operation over the system 10.

For the purposes of the present discussion, a Web service may be any algorithm, method, or collection of algorithms and/or methods, such as may be implemented in software and/or hardware, which is adapted to support interaction between computing entities, such as interaction over a network. The computing entities may include different applications, computers, devices, and so on.

Note that various components of the system 10 may be distributed over a network or may be included on a single computer system. For example, the Web service 20 may facilitate interfacing the SES 14 to the file system 12 over a network. For the purposes of the present discussion, a network may be any collection of intercommunicating computer systems or applications. Examples of networks include the Internet, Local Area Networks (LANs), wireless Code Division Multiple Access (CDMA) networks, and so on. Networks may support one or more communication protocols, such as Internet Protocol (IP), that are understood by different computing entities, such as servers and clients, which are connected to the network.

An example Web service includes a machine-to-machine interface described via Web Services Description Language (WSDL), where the term "machine-to-machine" includes application-to-application, application-to-device, and so on. A more specific example of a Webs service includes the Oracle SES Web service, which includes a Remote Procedure Call (RPC) interface to Oracle SES. The RPC interface enables a client application to invoke operations on the Oracle SES over a network. The client application may use a WSDL specification published by Oracle SES Web Services URL to send a request message using Simple Object Access Protocol (SOAP) to the Oracle SES. An accompanying Oracle SES server may then respond to the client application with a responsive SOAP message. This Web Service is identified by a Uniform Resource Identifier (URI) whose interfaces and binding are capable of being defined, described, and discovered by XML artifacts. The Oracle SES Web Service supports direct interactions with other software applications using XML-based messages and internet-based products.

This example Web Service may include various functionality, including the ability to disclose and describe itself to other applications by defining its functionality and attributes so that other applications can understand it. By providing a WSDL file, the Web Service makes its functionality available to other applications; may offer the ability to allow other services to locate it on the Web, such as by registration of the service in a Universal Description, Discovery and Integration (UDDI) registry so that applications can locate it; may offer the ability to be invoked by a remote application via an Internet standard protocol; may offer the ability to provide request-and-response type services or one-way style services using synchronous or asynchronous communication via messages, and so on.

In operation, the system 10 is implemented in an enterprise computing environment and is adapted to facilitate efficient crawling of the file system 12 by the SES system 14. Crawling of the file system 12 enables updating of the search index 18 to enable secure and accurate searches of the file system 12 for desired content.

For the purposes of the present discussion, a computing environment may be may be any collection of computing resources used to perform one or more tasks involving computer processing. An enterprise computing environment may be any computing environment used for a business or public entity. An example enterprise computing environment includes various computing resources distributed across a network and may further include private and shared content on Intranet Web servers, databases, files on local hard discs or file servers, email systems, document management systems, portals, and so on.

The NTFS crawler and connector 16 include computer code for selectively crawling the file system 12 via the Web service 20 interface and updating the search index 18 of the SES 14. For the purposes of the present discussion, a connector may be any software and/or hardware module adapted to perform a function over a network. The NTFS connector component of the crawler and connector 16 interfaces the SES 14 with the file system 12 via the Web service 20 to facilitate searching file repositories and other components of the file system 12. The crawler and connector 16 of the SES 14 may include one or modules, called sources, to facilitate collecting content retrieved by or provided by the connector component of the NTFS crawler and connector 16. For the purposes of the present discussion, a module may be any grouping of computer functionality.

A crawling process or operation (also called a crawl) may be any method that involves performing a predetermined processing action on each desired component of a system or entity being crawled. In the case of a file system, a crawling process may perform a predetermined processing action on each file and/or folder of the file system or of a subset thereof. The predetermined processing action may include, for example, scanning a file for hyperlinks; then caching the file in a local file system. Upon completion of a crawling operation on a file system, the file system is said to have been crawled, i.e., a crawl of the file system has completed.

An example crawling process employed in a specific example Web-based application includes populating a queue with file paths, such as URLs, corresponding to file locations. Initial URLs in the queue are called seed URLs. As the crawler software processes files identified by URLs in the queue, it removes the processed file from the queue and begins to process the file associated with the next URL in the queue. The processing may include fetching the file associated with the URL; scanning the file for hypertext links and inserting any new links into the URL queue. Duplicate links are discarded. The crawler software then caches the file in a local file system and registers the associated URL in a table. When the file system cache is full, indexing begins. Indexing includes selectively pushing document content into an index file to facilitate content searches. After indexing, the crawler software returns to queuing and caching. While the present example discusses a crawling operation as including indexing of files, note that crawling operations do not necessarily include indexing.

In the example embodiment 10 of FIG. 1, the NTFS crawler and connector 16 of the SES 14 initiates an initial crawl of the file system 12, including all files and folders therein that are to be indexed for searching via the search engine and index 18. The initial crawl of the file system 12 may be a complete conventional crawl, such as a crawl using existing methods and not necessarily FCD-based crawling, as discussed more fully below. For the purposes of the present discussion, a conventional crawl may be any crawl that is not limited to files or folders that have changed since a previous crawling operation. A conventional crawl, as the term is used herein, is not necessarily a crawl that is generally known in the art. For example, another type of crawl, such as proprietary crawl, may be employed without departing from the scope of the present teachings.

For illustrative purposes, the file system 12 is shown including files and folders 34 and an accompanying Access Control List (ACL) 36. The FCD 22 and FSW 26 include instructions, i.e., computer code, for monitoring file system changes, including changes to the files and folders 34 and any corresponding changes in permissions associated with the files and folders 34 as indicated in the accompanying ACL 36, as discussed more fully below. For the purposes of the present discussion, a permission associated with a file may be any right of a user or particular software and/or hardware application to use the file, such as by accessing, deleting, moving, or otherwise manipulating the file. Such a right may be specified via an ACL, such as the ACL 36.

Note that while the FCD 22 and the FSW 26 are discussed as including functionality for tracking changes to files, folders, and associated access or modification permissions, file system change tracking is not limited thereto. For example, file system changes may include not only any changes to content of files or folders and associated permissions, but may further include changes in metadata, i.e., data pertaining to or describing data within the files and folders; changes in associations between files and folders, and so on. In general, the exact types of changes that the FCD and FSW track are application specific and may be adjusted or changed to meet the needs of a given application without departing from the scope of the present teachings.

A user may employ the user interface 34 to set a predetermined crawling schedule for the system 10. After an initial crawl of the file system 12, the NTFS crawler and connector 16 employs the Web service 20 to facilitate using the FCD 22 to perform rapid incremental crawling of the file system 12. For the purposes of the present discussion, incremental crawling may be any crawling operation that limits crawling based on indicated changes since the last crawling operation. Accordingly, an incremental crawl of a file system may refer to a crawl that employs information about file system changes that have occurred since a previous crawl to implement a subsequent crawl.

In the present example embodiment, in response to receipt by the FCD 22 of a request from the SES system 14 (via the Web service 20) for FCD-based crawling of the file system 12, the FCD 22 is activated. The FCD 22 includes instructions, e.g., computer code, for using the configuration file 32 to retrieve Universal Naming Convention (UNC) paths of the file system 12 to watch.

For the purposes of the present discussion, a file system path may be any information specifying the location of a file, folder, or other computing resource in a file system. Examples of file system paths include UNC paths and associated Uniform Resource Locators (URLs) in an NTFS file system. An NTFS file system may be any organization of files, where the files are organized in accordance with Windows NTFS software and/or hardware specifications.

The FCD 22 then activates the FSW 26 to monitor the retrieved UNC paths, e.g., URLs, for changes. Upon detection by the FSW 26 of one or more file system changes, descriptions or indications of the detected changes are collected in the first results file 28 (or various instances thereof) of the FCD file system changes log 24.

For the purposes of the present discussion, collection of detected changes may refer to the accumulation of descriptions of or indications of changes, such as lists of changed files or folders, descriptions of particular types of changes, and so on. Such a list may be maintained in one or more files, such as the first results file 28, or in another organized and readily accessible storage mechanism, such as a database or tables thereof.

An indication of a detected change may be any description pertaining to the change, such as a description identifying a particular file or folder associated with a change. An indication of a detected change may also contain a more precise description of the change that occurred, such as information indicating that access rights for a given file have changed and how the access rights have changed, and when the change occurred.

Generally, the FCD 22 is started before the last crawling operation, i.e., crawl, so that the FCD 22 can capture changes in the file system 12 occurring since the last crawl without missing changes that occurred between completion of the last crawl and the start time of the FCD 22, as discussed more fully below. During the time interval between crawls, the FCD 22 detects changes made to the file system 12. File system changes may include, but are not limited to: changes to content of a file included in the file system; changes in user access or modification rights to a file or folder as determined with reference to an Access Control List (ACL); changes in paths to a file or folder, i.e., file or folder locations; deletions of files or folders, and so on. For the purposes of the present discussion, a folder of a file system may be any group of one or more files identified by a particular location in the file system, where the particular location is identified in part by a folder name. The terms "folder" and "directory" are employed interchangeably herein.

For the purposes of the present discussion, an Access Control List (ACL) may be any file or organization of data (such as a database to table thereof), containing information indicative of user and/or program permissions to access and/or manipulate a file, object, or application. An example ACL includes a list specifying a subject, such as a user or application, and an associated operation, such as access, delete, modify, and so on, to define one or more permissions for a given file, application, or software object. For example, an entry in an ACL, such as (John Doe, Delete) for a file "X", may indicate that John Doe has permission to delete the file "X" associated with the entry. A software object may be any group of software components that are part of a similar data structure or that otherwise may be grouped by associations between the components or functionality of the components.

The FCD 22 continues to detect and log file system changes in one or more instances of the first results file 28. Changes detected in the previous interval between file system crawls are maintained in the second results file 30.

When the next crawling operation begins, or after a given file-change detection interval, detected changes in the first results file 28 are copied to the second results file 30. The NTFS crawler and connector module 16 uses the contents of the second results file 30 to limit crawling of the file system 12 to only those files, folders, or other file system entities that are indicated (in the second results file 30) as having been changed. Note that copying of the contents of the first results file 28 to the second results file 30 occurs at a predetermined corresponding to the completion of the collection of indications of detected changes in the first results file 28, which may coincide with the start of a subsequent crawling operation. The FCD 22 is actively detecting file system changes at predetermined time intervals corresponding to intervals between crawls, which may be set in accordance with a predetermined schedule. A user may employ the user interface 34 to provide appropriate inputs to the SES 14 to establish a desired crawling schedule.

The second results file 30 may act as a backup file so that a power outage or system failure that occurs while the FCD is writing to the first results file 28 will not result in total loss of recently detected changes or indications thereof. Furthermore, in certain cases, the NTFS crawler and connector 16 may compare the second results file 30 with the first results file 28 to get a snapshot, i.e., indication of the file system changes detected since the last incremental crawl. Comparison between the files 28, 30 to obtain the snapshot may be particularly useful in implementations where the results files 28, 30 may include more changes than the changes detected since the last incremental crawl.

In summary, conventionally, incremental crawling required time-consuming scanning a file system for change attributes, such as the LastModifiedDate file attributes, in addition to scanning any ACLs, to determine file system changes in advance of an incremental crawl. The present embodiment overcomes this slow scanning process in part by collecting file system changes, such as changes to files or folders, approximately as the changes are occur. The system 10 employs the FCD 22 (and FSW 26) and changes log 24 to detect and collect file system changes, respectively. The NTFS crawler and connector 16 may then re-crawl only the files or folders associated with changes, including changes to permissions as indicated via associated ACL changes.

In the present embodiment, the FCD 22 uses the FileSystemWatcher object class provided by the .NET to track the changes in the NTFS system 12. The FCD 22 may be implemented as a Windows service that is installed on a Windows server. When active, the FCD Windows service 22 is adapted continuously watch a specified directory and record changes to files in the directory, changes to the directory itself, and so on.

The Web service 20 is adapted to selectively read the FCD 22 results, as stored in the changes log 24, in response to an appropriate request from the NTFS crawler and connector 16. The Web service 20 then communicate the detected changes or information about the detected changes to the SES 14, i.e., the NTFS crawler and connector 16. If a user employs the user interface 34 to switch the mode of the SES 14 to incremental crawling using the FCD 22, i.e., FCD-based incremental crawling, then the NTFS crawler and connector 16 may call the Web service 20 to retrieve a list of modified or deleted URLs (and/or other file system changes) for each incremental crawl.

The FCD 22 uses the configuration file 32 to get a list of UNC paths to watch. For each path, the FCD 22 spawns an FSW thread via the FSW module 26. Each thread watches for changes in a specified directory of the file system 12 and logs the results (or descriptions or indications thereof) in a file with the same name as the directory. The associated file is represented by the first results file 28. Note that in the present embodiment, various instances of the first results file 28 and the second results file 30 may be implemented in the changes log 24, where each instance may correspond to a different file system directory.

In a specific example implementation, the monitored directory name, called the SourceName, corresponds to the name of a corresponding NTFS source. Two versions 28, 30 of a results file are maintained per source, including the first results file 28 corresponding to currently detected changes, and a previous file corresponding to changes detected during a previous change-detection interval.

For the purposes of the present discussion, a file system source may be any type of file system or file system component identifiable by a similar structure or other characteristics. Examples of sources include HTML pages, databases, email systems, intranet portals, document management systems, and custom applications. An SES source may refer to a software module, such as a plug-in, that is adapted to facilitate interfacing the SES with the file system source. A user may employ the user interface 34 to register SES sources with the SES 14 for use thereby.

The current file 28 is where the FCD 22 and accompanying FSW 26 record detected changes or descriptions thereof. The previous file 30 contains the changes crawled in the previous incremental crawl.

The Web service 20 selectively returns a list of modified URLs detected since the last incremental crawl to the SES 14, which may act as a server. The Web service 20 is further adapted to check if the service corresponding to the FCD 22 is alive, i.e., enabled or active. If the FCD service 22 is not alive, then the Web service 20 may throw an appropriate error message, as discussed more fully below. If the FCD service 22 is alive, then the Web service 20 may then check the time at which the FCD service 22 was started. If the FCD service 22 was started before the crawl or incremental completed, then the Web service 20 may fetch a list of modified URLs from the second results file(s) 30. If the FCD service 22 was started after completion of the last crawl or incremental crawl, then the Web service 20 may return one or more predetermined seed URLs to force a conventional crawl or incremental crawl, such as a crawl not using the FCD 22. This may ensure that none of changes to a monitored NTFS source of the file system 12 that have occurred between the last crawl time and the start time of the FCD 22 are missed by the system 10.

To fetch the list of modified URLs from the changes log 24, the Web service 20 may implement copying of changes in the current results file 28 to the previous file 30. The FCD 22 may continue to write to the current file 28. The Web service 20 implements a method that reads the contents of the previous file 30 and sends a list of modified/deleted URLs back to the SES 14 in response thereto. The copy mechanism implemented by the Web service 20 facilitates determining file system changes that have occurred between successive incremental crawls.

In the present example embodiment, the changes log 24 is implemented via Oracle External Tables (OET), and results, i.e., detected changes or descriptions thereof (e.g., corresponding URLs) can be fetched via the Web service 20 via an Structured Query Language (SQL) statement.

The FCD 22 facilitates recording changes in comma-separated files 28, 30. Note however, that other types of files may be used without departing from the scope of the present teachings. Furthermore, the FCD 22 also records the time at which a file system change occurs. Comma-separated files may readily be converted to OETs 24, which are usable with SQL queries. SQL queries can be issued via the Web service 20 and/or the SES 14 for retrieval of modified URLs from the changes log 24 for a particular SES source program (as represented by the NTFS crawler and connector 16) after the source's last crawl time.

In an example operative scenario, a user employs the user interface 34 to define a new NTFS source, wherein an operational mode thereof is set to "Incremental crawl with File Change Detector 22". The user may provide the unique way to identify the source, such as via a parameter called "Unique name to identify this source."

A user may employ the user interface 34 to manually trigger an incremental crawl via the NTFS crawler and connector 16. However, preferably, the NTFS crawler and connector 16 is provided a predetermined crawling schedule such that crawling or incremental crawling is performed at one or more predetermined times.

When an initial crawl is initiated, the FCD 22 is automatically configured to perform in accordance with rules set up via the source (e.g., the source represented by the NTFS crawler and connector 16). The FCD 22 includes instructions to automatically configure itself to monitor file system changes that are relevant for the source 16. Alternatively, a user may employ the user interface 34 to make any requisite configuration adjustments to the FCD 22.

During an initial maintenance crawl, the connector 16 checks if the FCD was started before the last registered crawl time. In case of the first maintenance crawl, the connector 16 initiates an incremental crawl without use of the FCD 22. A conventional or standard crawl may be used for the initial crawl.

For a subsequent maintenance crawl, the connector 16 confirms that the FCD 22 was started before the last crawl time. The connector 16 then initiates an FCD-based incremental crawl. In this case, the connector 16 captures some of the changes between the initial crawl and the first incremental crawl in addition to changes that have occurred between the first incremental crawl and a subsequent next incremental crawl.

In the present example operative scenario, the system 10 may be set up for FCD-based incremental crawls for an existing NTFS source as follows. An NTFS patch may be employed to add additional parameters, such as "Incremental crawl with File Change Detector" and "Unique name to identify this source". The parameter "Incremental crawl with File Change Detector" is set to true. A user employs the "Unique name to identify this source" to uniquely identify the applicable source. The FCD 22 is then configured to use the desired source. Those skilled in the art with access to the present teachings will know how to configure the FCD 22 to work with a given source without undue experimentation. Exact configuration details are application specific and may vary depending upon the application.

During the next maintenance crawl, the connector 16 checks if the FCD 22 was started before the last crawl time. In case of the first maintenance crawl following configuration of the FCD 22, a crawl not employing FCD-based incremental crawling may be employed. FCD-based crawling, i.e., incremental crawling employing the FCD 22 and the changes log 24, may be used for subsequent incremental crawling.

Figure 2:
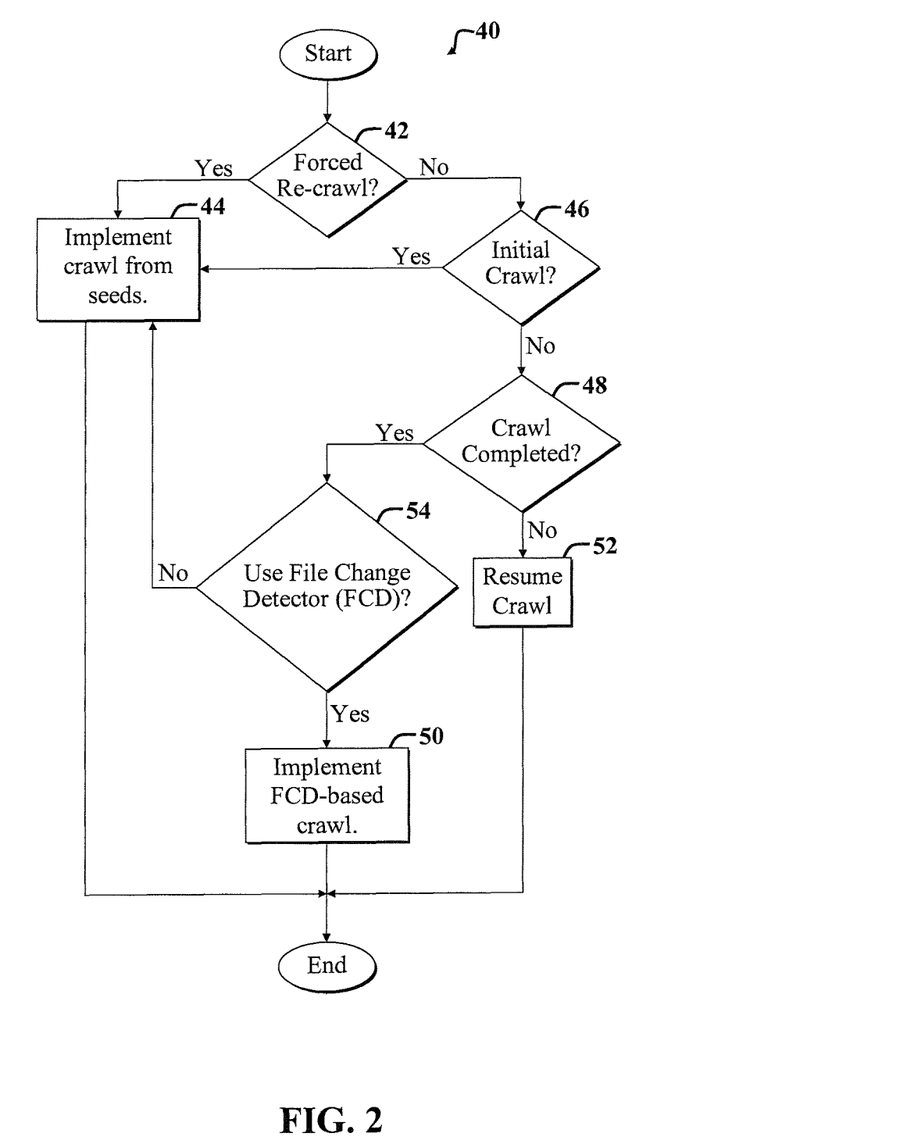
FIG. 2 is a diagram of a first method adapted for use with the system of FIG. 1 for controlling implementation of file system crawls.

FIG. 2 is a diagram of a first method 40 adapted for use with the system 10 of FIG. 1 for controlling implementation of file system crawls. The method 40 may be initiated via the SES 14 and accompanying NTFS crawler and connector 16. The method 40 includes a first crawl-checking step 42, which includes determining if the SES 14 is to perform a forced re-crawl. If the SES 14 has determined that a forced re-crawl is desired, then an initial crawling step 44 is performed. The initial crawling step 44 may include conventional crawling from seed URLs. After implementation of the initial crawling step 44, the example method 40 completes. For the purposes of the present discussion, a seed URL may be any description of a path to a file or folder used to begin a conventional or an initial crawl of a file system.

If the first crawl-checking step 42 determines that a forced re-crawl is not currently to be performed, a second crawl-checking step 46 determines if an initial crawl is to be performed. If an initial crawl is to be performed, then the initial crawling step 44 executes. Otherwise, a crawl-completion-checking step 48 is implemented.

If the crawl-completion-checking step 48 determines that the current crawl has not been completed, the current crawl continues at a resume-crawl step 52. After completion of the resume-crawl step 52, the method 40 completes. If the crawl-completion-checking step 48 determines that the last crawl has completed, then an FCD-checking step 50 is performed.

If the FCD-checking step 54 determines if use of FCD 22 of FIG. 1 is desired, i.e., requested by a module of the SES 14, then conventional crawling may be performed via the initial crawling step 44. Note that at this stage, the conventional crawling performed by the initial crawling step 44 may include incremental crawling using preexisting methods, i.e., conventional incremental crawling.

If the FCD-checking step 54 determines that FCD-based crawling is desired, then the FCD 22 of FIG. 1 is enabled, and an FCD-based file system crawl is implemented in an FCD-based-crawl step 50 before the method 40 completes.

Figure 3:
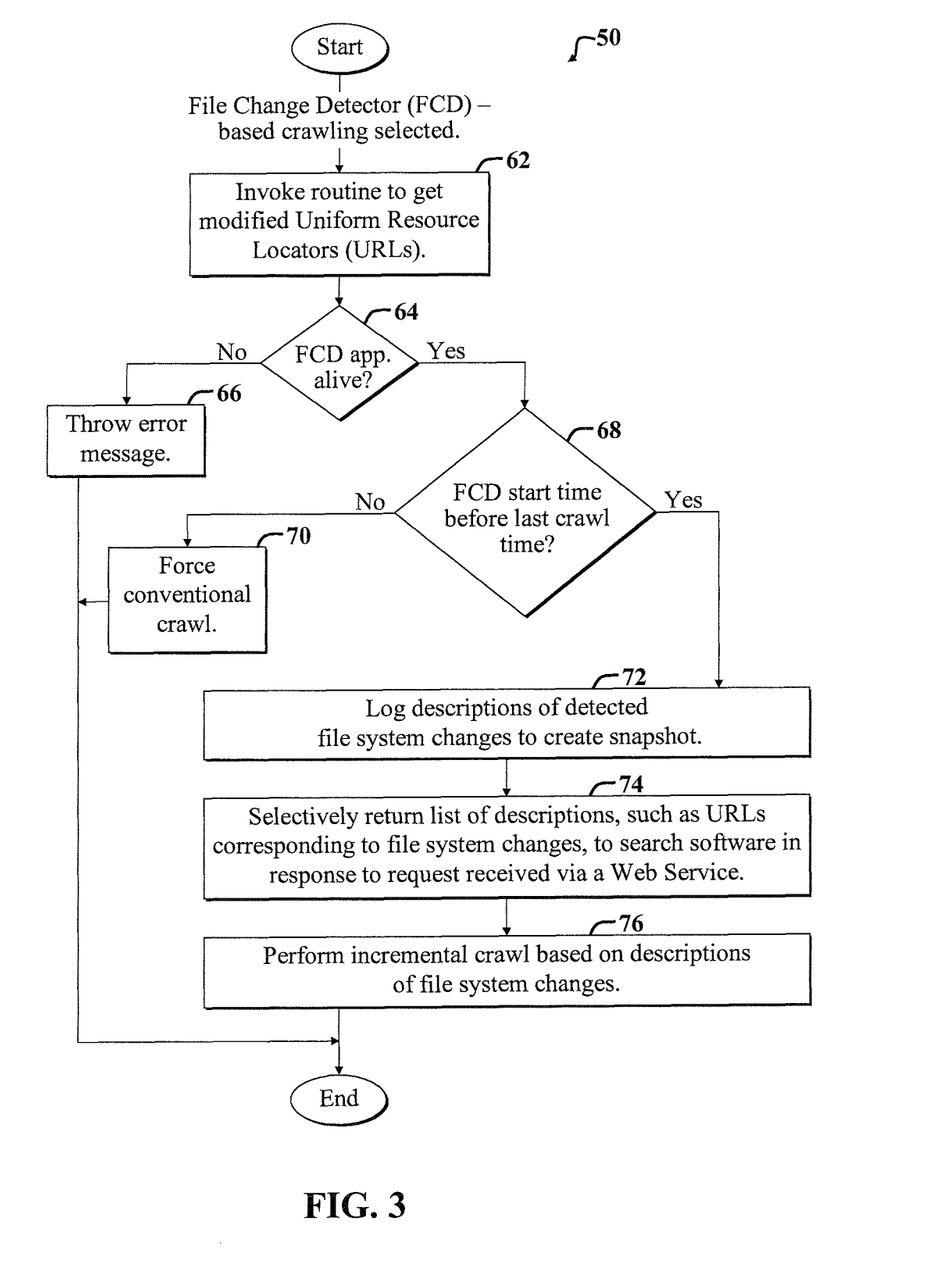
FIG. 3 is a diagram of a second method adapted for use with the method of FIG. 2 for implementing File Change Detector (FCD) based crawling.

FIG. 3 is a diagram of a second method 50 adapted for use with the method 40 of FIG. 2 for implementing File Change Detector (FCD) based crawling. The method 50 corresponds to a sequence of steps represented by the FCD-based-crawl step 50 of FIG. 2.

The second method 50 includes an invoking step 62, which includes invoking a routine (e.g., GetModifiedURLs) to retrieve URLs associated with modified files and folders from the changes log 24 of FIG. 1.

The invoking step 62 initiates an FCD-status-checking step 64, which includes determining if the FCD module 22 of FIG. 1 is enabled and active, i.e., alive, or not. If the FCD module 22 is not active, then an error message is triggered in an error-throwing step 66 before the method 50 completes.

If the FCD module 22 is alive, then a start-time-checking step 68 is performed. The start-time-checking step 68 determines if the time at which the FCD module 22 of FIG. 1 was activated is before the last crawl time. If the FCD module 22 was not activated before the last crawl time, a conventional crawl is performed in a forced-crawl step 70 before the method 50 completes. This helps to ensure that the FCD functionality does not miss any changes occurring between the completion of the last crawl and the start time of the FCD module 22. If the FCD module 22 was activated before the last crawl time, then a description-logging step 72 is performed.

The description-logging step 72 includes detecting file system changes and logging descriptions of the detected file system changes to create a so-called snapshot of changes occurring between crawl intervals.

Subsequently, a results-returning step 74 is performed. With reference to FIGS. 1 and 3, the results-returning step 74 includes selectively returning, via the Web service 20, a list of descriptions, such as URLs corresponding to file system changes, to search software, such as the SES 14 of FIG. 1, in response to a request received by the changes log 24 or accompanying FCD 22 from the SES 14.

For the purposes of the present discussion, search software may be any collection of computer code or instructions adapted to search a computing environment in accordance with a particular query. SES software may be any collection of computer code or instructions adapted to enable searching for content across multiple locations. Example locations include websites, file servers, content management systems, enterprise resource planning systems, customer relationship management systems, business intelligence systems, databases, and so on.

Next, an incremental-crawl step 76 includes performing an incremental crawl of the file system 12 based on descriptions of the file system changes retrieved from the second results file 30 of FIG. 1. In the present example embodiment, the results files 28, are implemented via Oracle Extensible Tables (OET). The incremental crawling performed via the incremental-crawl step 76 is called FCD-based crawling and is limited to crawling of file system components, e.g., files, folders, and any ACLs, that are indicated as have been changed since the last crawl. Such indications are available in the second results file 30 of FIG. 1 or by comparison of contents of the second results file 30 with contents of the first results file 28.

Figure 4:
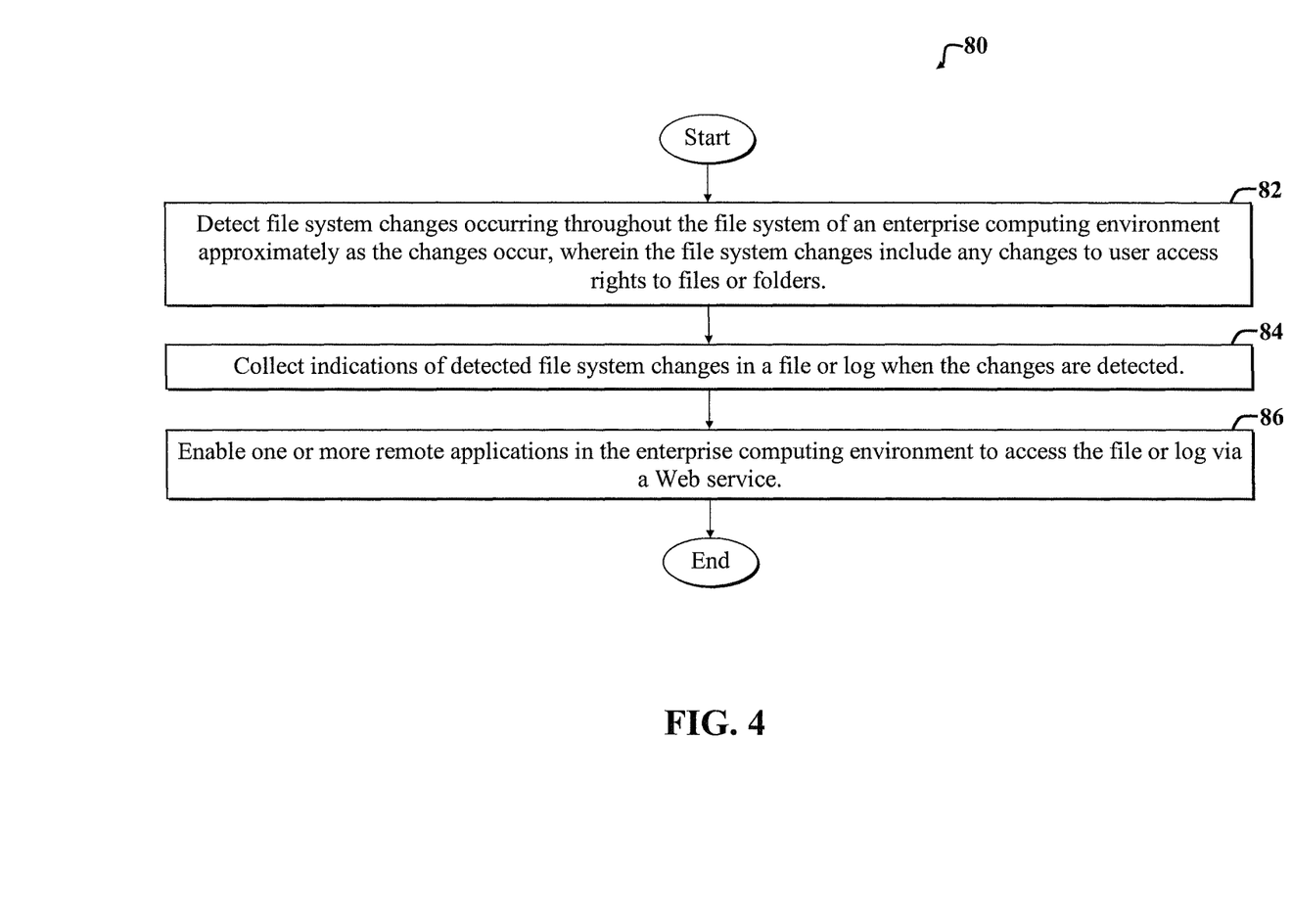
FIG. 4 is a flow diagram of a third method adapted for with the system of FIG. 1 for detecting and logging file system changes.

FIG. 4 is a flow diagram of a third method 80 adapted for with the system 10 of FIG. 1 for detecting and logging file system changes. The method 80 includes a change-detection step 82, which includes detecting file system changes occurring throughout the file system of an enterprise computing environment approximately as the changes occur. In the present example embodiment, the file system changes include any changes to user access rights to files or folders.

Subsequently, a change-collection step 84 is performed. The change-collection step 84 includes collecting indications of indications of detected file system changes in a file or log when the changes are detected.

Next, an enabling step 86 is performed. The enabling step 86 includes enabling one or more remote applications in the enterprise computing environment to access the file or log via a Web service.

Various steps 82-86 of the method 80 may be changed, replaced with other steps, omitted, and so on to meet the needs of a given application and without departing from the scope of the present teachings. For example, it is anticipated that certain implementations need not be in an enterprise computing environment. Furthermore, the one or remote applications may include search software, file system crawling software, and so on, and an interface other than a Web service may be employed.

An alternative example method includes: detecting changes to a file system of the computing environment when changes to the file system occur and providing indications of detected changes in response thereto; and collecting the indications of detected changes as the changes are detected.

Figure 5:
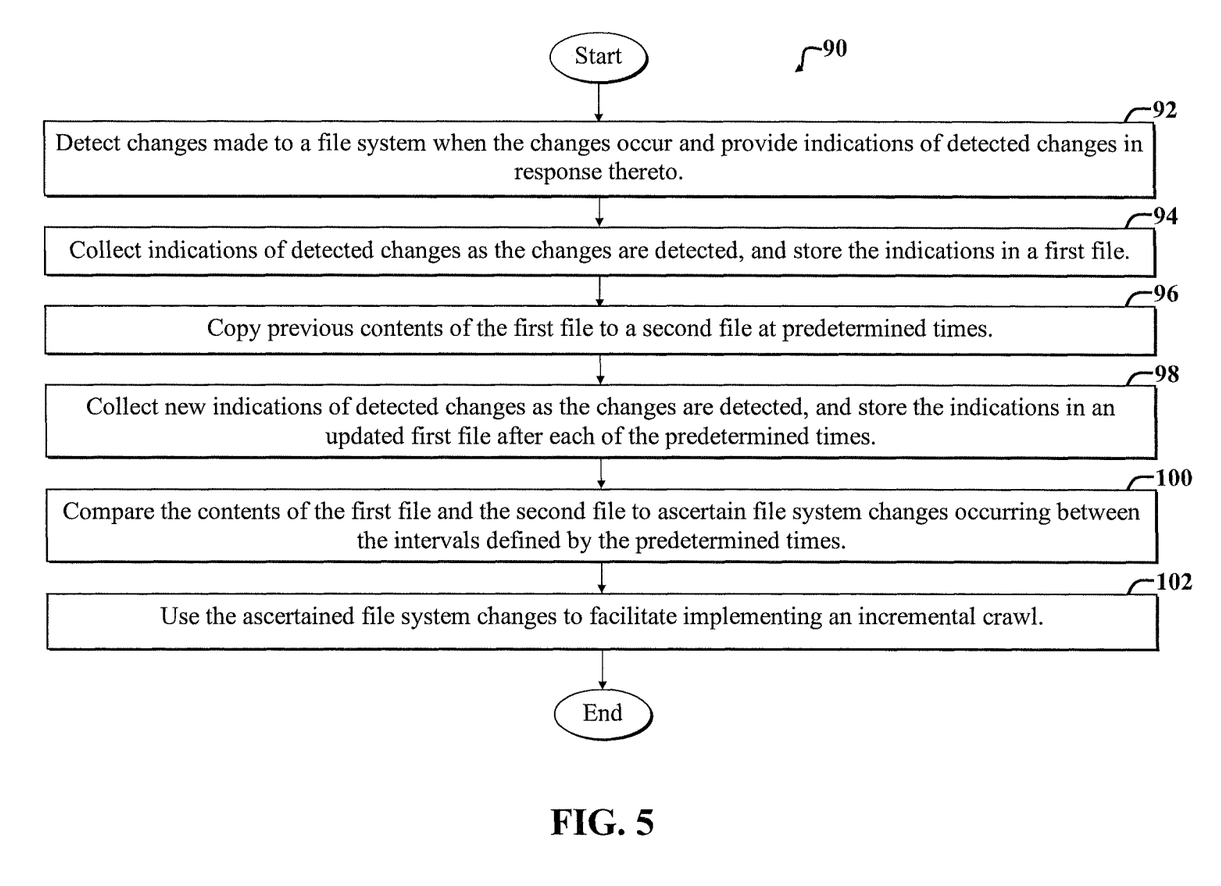
FIG. 5 is a flow diagram of a fourth method adapted for use with the system of FIG. 1 for detecting file system changes and using the changes for a crawling operation.

FIG. 5 is a flow diagram of a fourth method 90 adapted for use with the system 10 of FIG. 1 for detecting file system changes and using the changes for a crawling operation. The example method 90 includes a first step 92, which includes detecting changes made to a file system when the changes occur and provide indications of detected changes in response thereto.

A second step 94 includes collecting indications of detected changes as the changes are detected, and storing the indications in a first file, such as the file 28 of FIG. 1.

A third step 96 includes copying previous contents of the first file to a second file, e.g., the second file 30 of FIG. 1, at predetermined times. Examples of predetermined times include after completion of detecting changes for the first file 28 and just before initiation of an incremental crawling operation.

A fourth step 98 includes collecting new indications of detected changes as the changes are detected and then storing the indications in an updated first file after each of the predetermined times.

A fifth step 100 includes comparing the contents of the first file and the second file to ascertain file system changes occurring between the intervals defined by the predetermined times.

A sixth step 102 includes using the ascertained file system changes to facilitate implementing an incremental crawl.

Note that the example method 90 may be substantially modified without departing from the scope of the present teachings. For example, an alternative example method includes performing the following steps: 1) observing a file system of the computing environment during a predetermined time interval and providing a signal when a predetermined change to the file system is detected during the predetermined time interval; 2) employing the signal to log a description of detected file system changes; and 3) using a logged description of the file system changes to perform an incremental crawl of the file system.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for monitoring changes in an electronic file system, the method comprising:
  performing a first crawling operation of a designated file system of an enterprise application to perform a predetermined processing action on each file or folder in the designated file system or a subset thereof;
  actively monitoring, during a first time interval starting prior to beginning the first crawling operation and ending prior to beginning a second crawling operation, the designated file system to detect changes to the designated file system as the changes occur during the first time interval, where changes to the designated file system monitored include whether contents of a file or folder included in the designated file system have changed and whether access rights or modification rights to a file or folder in the designated file system have changed;
  collecting indications of detected changes as the changes are detected during the first time interval;
  logging collected indications of detected changes that occur during the first time interval into a first results file;
  copying, at predetermined time intervals, the collected indications of detected changes that occur during the first time interval from the first results file to a second results file;
  performing a second crawling operation, based on returned indications of detected changes during the first time interval included in the second results file, of only files and folders in the designated file system indicated as having changed during the first time interval by the indications of detected changes copied into the second results file;
  actively monitoring, during a second time interval prior to beginning the second crawling operation and ending prior to beginning a third crawling operation, the designated file system to detect changes to the designated file system as the changes occur during the second time interval;
  collecting indications of detected changes as the changes are detected during the second time interval;
  logging the collected indications of detected changes that occur during the second time interval into the first results file;

copying, at predetermined time intervals, the collected indications of detected changes that occur during the second time interval from the first results file to the second results file; and performing a third crawling operation, based on returned indications of detected changes during the second time interval included in the second results file, of only files and folders in the designated file system indicated as having changed during the second time interval by the indications of detected changes copied into the second results file.

2. The method of claim 1 wherein the second results file is stored via an Oracle Extensible Table (OET).

3. The method of claim 1 wherein performing an incremental crawl includes using a Web service to retrieve information from the second results file to search software.

4. The method of claim 3, wherein the search software includes Secure Enterprise Search (SES) software.

5. The method of claim 3, wherein detecting includes using a File Change Detector (FCD) to determine file system paths (UNC paths) to monitor, and then monitoring files or folders associated with the file system paths.

6. The method of claim 5, wherein using the FCD further includes employing the FCD to selectively activate File System Watcher (FSW) functionality to detect file system changes.

7. The method of claim 5 further including using the Web service to determine if the FCD started before or after completion of a most recent crawl of the file system.

8. An apparatus for monitoring changes in an electronic file system, the apparatus comprising:
a processor;
a non-transitory processor readable storage device including one or more instructions executable by the processor for:
performing a first crawling operation of a designated file system of an enterprise application to perform a predetermined processing action on each file or folder in the designated file system or a subset thereof;
actively monitoring, during a first time interval starting prior to beginning the first crawling operation and ending prior to beginning a second crawling operation, the designated file system to detect changes to the designated file system as the changes occur during the first time interval, where changes to the designated file system monitored include whether contents of a file or folder included in the designated file system have changed and whether access rights or modification rights to a file or folder in the designated file system have changed;
collecting indications of detected changes as the changes are detected during the first time interval;
logging collected indications of detected changes that occur during the first time interval into a first results file;
copying, at predetermined time intervals, the collected indications of detected changes that occur during the first time interval from the first results file to a second results file;
performing a second crawling operation, based on returned indications of detected changes during the first time interval included in the second results file, of only files and folders in the designated file system indicated as having changed during the first time interval by the indications of detected changes copied into the second results file;
actively monitoring, during a second time interval prior to beginning the second crawling operation and ending prior to beginning a third crawling operation, the designated file system to detect changes to the designated file system as the changes occur during the second time interval;
collecting indications of detected changes as the changes are detected during the second time interval;
logging the collected indications of detected changes that occur during the second time interval into the first results file;
copying, at predetermined time intervals, the collected indications of detected changes that occur during the second time interval from the first results file to the second results file; and
performing a third crawling operation, based on returned indications of detected changes during the second time interval included in the second results file, of only files and folders in the designated file system indicated as having changed during the second time interval by the indications of detected changes copied into the second results file.

9. A non-transitory processor-readable storage device including one or more instructions executable by the processor for:
performing a first crawling operation of a designated file system of an enterprise application to perform a predetermined processing action on each file or folder in the designated file system or a subset thereof;
actively monitoring, during a first time interval starting prior to beginning the first crawling operation and ending prior to beginning a second crawling operation, the designated file system to detect changes to the designated file system as the changes occur during the first time interval, where changes to the designated file system monitored include whether contents of a file or folder included in the designated file system have changed and whether access rights or modification rights to a file or folder in the designated file system have changed;
collecting indications of detected changes as the changes are detected during the first time interval;
logging collected indications of detected changes that occur during the first time interval into a first results file;
copying, at predetermined time intervals, the collected indications of detected changes that occur during the first time interval from the first results file to a second results file;
performing a second crawling operation, based on returned indications of detected changes during the first time interval included in the second results file, of only files and folders in the designated file system indicated as having changed during the first time interval by the indications of detected changes copied into the second results file;
actively monitoring, during a second time interval prior to beginning the second crawling operation and ending prior to beginning a third crawling operation, the designated file system to detect changes to the designated file system as the changes occur during the second time interval;
collecting indications of detected changes as the changes are detected during the second time interval;
logging the collected indications of detected changes that occur during the second time interval into the first results file;

copying, at predetermined time intervals, the collected indications of detected changes that occur during the second time interval from the first results file to the second results file; and performing a third crawling operation, based on returned indications of detected changes during the second time interval included in the second results file, of only files and folders in the designated file system indicated as having changed during the second time interval by the indications of detected changes copied into the second results file.

\* \* \* \* \*